United States Patent [19]

Fushihara

[11] 4,426,261

[45] Jan. 17, 1984

[54] METHOD FOR SEPARATING DRINKING WATER

[76] Inventor: Tomotsuru Fushihara, 2-12, Hazawa, Nerima-ku, Tokyo, Japan

[21] Appl. No.: 332,756

[22] Filed: Dec. 21, 1981

[30] Foreign Application Priority Data

Dec. 23, 1980 [JP] Japan .......................... 55-185431[U]

[51] Int. Cl.³ ........................ C25B 1/16; C25B 1/22; C25B 9/00; C02C 5/12
[52] U.S. Cl. .................................... 204/98; 204/103; 204/130; 204/151; 204/260
[58] Field of Search ....................... 204/260, 253–258, 204/291–294, 98, 103, 151, 149, 130

[56] References Cited

U.S. PATENT DOCUMENTS

| | | | |
|---|---|---|---|
| 2,204,982 | 6/1940 | Dähling | 204/260 X |
| 2,349,998 | 5/1944 | Trinius | 204/260 X |
| 2,363,386 | 11/1944 | Bock | 204/260 X |
| 3,131,137 | 4/1964 | Lancaster et al. | 204/260 X |
| 3,236,692 | 2/1966 | Lewis | 204/260 X |
| 3,390,065 | 6/1968 | Cooper | 204/260 X |
| 4,128,464 | 12/1978 | Idota | 204/151 |
| 4,326,935 | 4/1982 | Moeglich | 204/103 X |

*Primary Examiner*—Donald R. Valentine
*Attorney, Agent, or Firm*—Birch, Stewart, Kolasch & Birch

[57] ABSTRACT

An electrolytic cell for electrolytically dividing drinking water for domestic use is provided, which comprises a column-like or hollow bar-like negative electrode centrally located, an annular positive electrode arranged around the negative electrode, an annular negative electrode arranged around the positive electrode, and a membrane arranged between the positive and negative electrodes.

2 Claims, 2 Drawing Figures

METHOD FOR SEPARATING DRINKING WATER

FIELD OF THE INVENTION

This invention relates to an electrolytic cell, and in more detail to an electrolytic cell for electrolytically dividing drinking water for domestic use, so-called city water, into alkaline and acid water.

DESCRIPTION OF THE PRIOR ART

A hitherto used electrolytic cell of this kind includes both ⊕ (plus) and ⊖ (minus) electrodes arranged therein, which are flat plate-like or column-like, so that the electrolytic efficiency is low considering for its capacity and an attempt to make the cell smaller unavoidably causes even more reduction in the electrolytic efficiency.

SUMMARY OF THE INVENTION

In view of this, the electrolytic cell according to the invention for the purpose of eliminating the disadvantages above described, comprises a column-like ⊖ (minus) electrode centrally arranged, annular ⊕ (plus) and ⊖ (minus) electrodes alternately located in concentric circles on an outer side of said column-like electrode, and membranes arranged between said annular plus and minus electrodes, thereby enabling all circumferential wall surfaces of said annular electrodes to effect electrolytic operation effectively and particularly enabling the device to perform electrolytic operation the annular plus electrode arranged between the inner and outer minus electrodes with all inner and outer circumferential surfaces over 360° of the annular plus electrode in cooperation with surfaces of the minus electrodes opposite thereto to greatly increase electrolytic efficiency.

BRIEF DESCRIPTION OF DRAWINGS

The drawings illustrated the embodiment of the present invention, wherein.

DETAILED DESCRIPTION OF THE INVENTION

Figure 1:
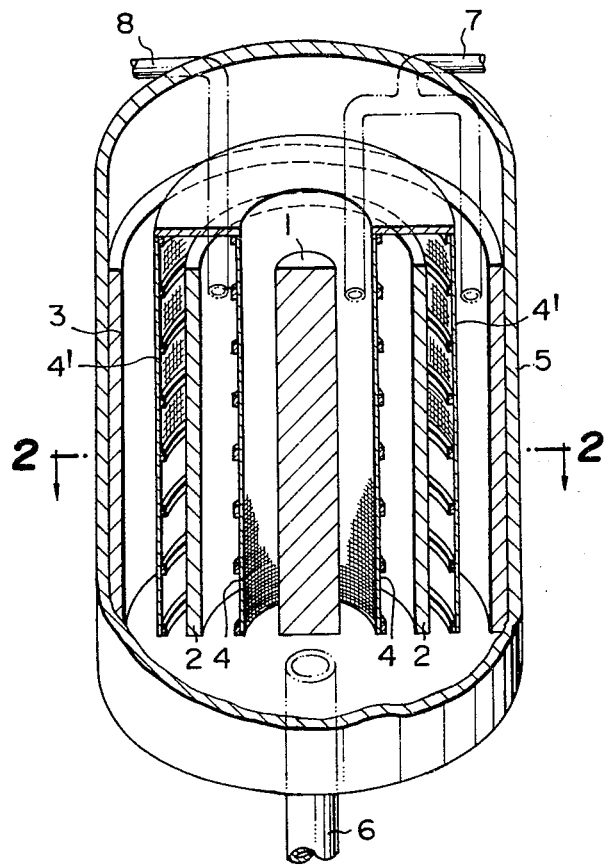
FIG. 1 is a partially broken away perspective view of the cell.
Figure 2:
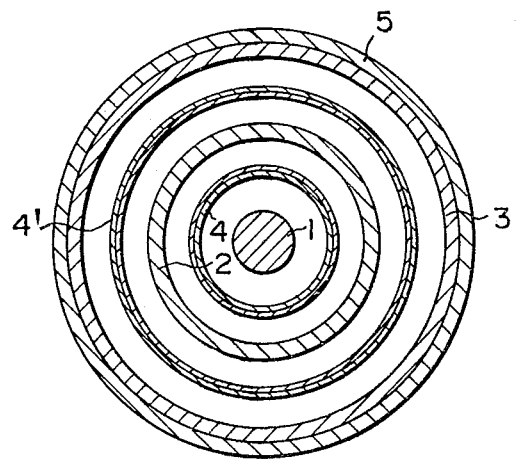
FIG. 2 is a sectional view of the cell taken along a line 2—2 in FIG. 1.

One embodiment of the present invention will be explained with reference to drawings hereinafter. An electrolytic cell according to the invention comprises a ⊖ (minus) electrode (1) in the form of a column or hollow bar, and a ⊕ (plus) electrode (2) and a ⊖ (minus) electrode (3) which are annularly formed and arranged in concentric circles, so that the minus electrodes (1) and (3) are arranged on inner and outer sides of the annular plus electrode plate (2), respectively.

The above minus electrodes (1) and (3) and plus electrode (2) may be made of magnetite, ferrite or stainless steel tubes, carbon bars or the like. In case of an electrolytic cell adapted to be directly connected to a faucet of city water in use, the electrodes may be made of magnetite or ferrite which do not give off any injurious material, while for a cell for a reservoir, the electrodes can be made of carbon bars.

Membranes (4) and (4') are formed of a permeable material and arranged so as to divide the electrodes.

The respective electrodes (1), (2) and (3) and the membranes (4) and (4') are housed in a cylindrical casing (5) which is provided at its lower portion with a water inlet (6) and at its upper portion with an alkaline water outlet (7) and an acid water outlet (8), respectively.

The above casing (5) is not necessarily essential. Cover plates may be secured to upper and lower ends of the outermostly arranged annular electrode to form a hermetic casing. In this structure the outermost electrode serves as a casing, but even if one touches the outermost electrode serving as the casing, there is no risk of electric shock. Thus it is not necessary to take any particular precaution to avoid electric shock because the minus and plus electrodes are alternately concentrically arranged so as to locate one of plus and minus electrodes on the outermost side.

The alkaline water outlet (7) is so constructed as to extract therethrough the alkaline water electrolytically produced on the inner side of the membrane (4) and on the outer side of the membrane (4'). The acid water outlet (8) is adapted to extract therethrough the acid water electrolytically produced in the part defined by the membranes (4) and (4').

With the electrolytic cell constructed as above described, an electrolytic operation with high efficiency is achieved by the inner and outer side surfaces of the annular plus electrode in cooperation with the centrally positioned minus electrode and the minus electrode located on the outer side of the annular plus electrode, thereby greatly improving the electrolytic efficiency in comparison with the prior art.

In addition, as all the annular surfaces effectively perform the electrolytic operation, the cell can be made smaller than conventional electrolytic cells having plate-like electrodes without reducing electrolytic efficiency.

Moreover, as the electrodes are annular (or cylindrical), the outermost electrode itself forms a casing, thereby greatly facilitating the manufacturing of the electrolytic cell to.

Furthermore, the electrolytic cell according to the invention is not limited to the triple construction as shown in the drawings. An electrolytic cell of double construction wherein a plus electrode is centrally arranged, on the outer side of which an annular minus electrode is located can also sufficiently achieve the object of the invention.

I claim:

1. A method for separating drinking water into acidic and alkaline components comprising:
    introducing water into an electrolytic cell having,
    a centrally located column-like negative electrode;
    an annular positive electrode positioned around said negative column-like electrode;
    an annular negative electrode positioned around said annular positive electrode;
    a membrane generally U-shaped in cross-section having two concentric side walls and a top wall extending therebetween, said membrane enclosing said positive electrode with one of said side walls being arranged between said positive electrode and said column-like negative electrode and the other of said side walls being arranged between said positive electrode and said annular negative electrode forming an annular volume surrounding said positive electrode, an inner annular space between said membrane and said column-like negative electrode, and an outer annular space between said membrane and said annular negative electrode;

removing acidic water from said annular volume; and removing alkaline water from said inner and outer annular spaces.

2. A method as in claim 1, wherein said electrolytic cell is attached to a water faucet.

* * * * *